US012157320B2

(12) United States Patent
Iida

(10) Patent No.: US 12,157,320 B2
(45) Date of Patent: Dec. 3, 2024

(54) LIQUID SUPPLY DEVICE, METHOD OF SUPPLYING LIQUID, AND IMAGE RECORDING DEVICE

(71) Applicant: BROTHER KOGYO KABUSHIKI KAISHA, Nagoya (JP)

(72) Inventor: Shotaro Iida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 14 days.

(21) Appl. No.: 18/050,118

(22) Filed: Oct. 27, 2022

(65) Prior Publication Data

US 2023/0139735 A1 May 4, 2023

(30) Foreign Application Priority Data

Oct. 29, 2021 (JP) ................................ 2021-177150

(51) Int. Cl.
*B41J 2/175* (2006.01)

(52) U.S. Cl.
CPC ........... *B41J 2/17596* (2013.01); *B41J 2/175* (2013.01); *B41J 2/17566* (2013.01); *B41J 2002/17589* (2013.01)

(58) Field of Classification Search
CPC .... B41J 2/17596; B41J 2/175; B41J 2/17566; B41J 2002/17589
See application file for complete search history.

(56) References Cited

U.S. PATENT DOCUMENTS

| | | | | |
|---|---|---|---|---|
| 10,639,904 | B2 | 5/2020 | Nakamura et al. | |
| 2005/0195246 | A1 | 9/2005 | Ogawa | |
| 2008/0198207 | A1 | 8/2008 | Katada | |
| 2010/0238207 | A1 * | 9/2010 | Shinkai | B41J 2/17566 347/85 |
| 2015/0091956 | A1 | 4/2015 | Akiyama et al. | |
| 2015/0273854 | A1 | 10/2015 | Ito et al. | |

FOREIGN PATENT DOCUMENTS

| | | | | |
|---|---|---|---|---|
| JP | 2000211156 | A | 8/2000 | |
| JP | 2003094686 | A * | 4/2003 | B41J 2/175 |
| JP | 2020011485 | A | 1/2020 | |

OTHER PUBLICATIONS

Extended European Search Report dated Mar. 15, 2023 from related EP 22204342.4.

* cited by examiner

*Primary Examiner* — Yaovi M Ameh
(74) *Attorney, Agent, or Firm* — Scully, Scott, Murphy & Presser, P.C.

(57) ABSTRACT

There is provided a liquid supply device including: first and second valves; a head; a suction mechanism; and a controller. The controller is configured to: execute a valve-opening operation of opening the first and second valves, in response to a suction instruction; execute a valve-closing operation of closing the first valve depending on output of a first signal, and closing the second valve depending on output of a second signal, the first signal indicating that an amount of a first liquid in a first tank is a first threshold value or more, the second signal indicating that an amount of a second liquid in a second tank is a second threshold value or more; and execute a suction operation of driving the suction mechanism for a predetermined time period.

13 Claims, 9 Drawing Sheets

LIQUID SUPPLY DEVICE, METHOD OF SUPPLYING LIQUID, AND IMAGE RECORDING DEVICE

REFERENCE TO RELATED APPLICATIONS

This application claims priority from Japanese Patent Application No. 2021-177150 filed on Oct. 29, 2021. The entire content of the priority application is incorporated herein by reference.

BACKGROUND ART

There is known an image recording device comprising a head and a carriage mounted with the head, that discharges ink from nozzles of the head when the carriage moves in a predetermined direction. The image recording device has an ink supply device that supplies ink to the head from a reservoir of the ink. In the case of a plurality of kinds of inks is supplied, the ink supply device has a plurality of ink channels provided between a plurality of the reservoirs and the head.

There is a printer comprising: a head having four kinds of nozzles respectively discharging four colors of inks; and a cap collectively covering the four kinds of nozzles. In this printer, the four colors of inks are respectively supplied to four sub-tanks from four cartridges, and four ink channels are employed to respectively supply the four colors of inks to the head from the four sub-tanks.

DESCRIPTION

In the printer described in Japanese Patent Publication Laid Open No. 2020-011485, there is performed a so-called initial introduction where the four colors of inks are respectively initially introduced into the four ink channels by a suction pressure being applied from the head side. In this printer, ink is supplied employing a water head difference between the cartridge and the sub-tank. Therefore, as much ink will flow into the sub-tank from the cartridge as an amount of ink in the sub-tank that has flowed to the head side due to the suction pressure.

Sometimes, there is a difference in resistance between the four ink channels connecting the four sub-tanks and the head. In such a case, when the previously-mentioned initial introduction is performed, an amount of ink flowing to the head side from the sub-tank through a channel having a small channel resistance will increase, and an amount of ink flowing to the head side from the sub-tank through a channel having a large channel resistance will decrease. There will thus occur a difference in ink introduction amounts between the plurality of ink channels. This will result in that when, for example, suction time is set so that a sufficient amount of ink will flow to the head side through the channel having a large channel resistance, an excessive amount of ink will flow to the head side through the channel having a small channel resistance.

The present disclosure, which was made in view of the above-described circumstances, has an object of providing a means by which difference in liquid amounts flowing into a head through a plurality of channels by suction becomes smaller.

(1) A liquid supply device according to an aspect of the present disclosure includes: a first reservoir configured to store a first liquid;

a second reservoir configured to store a second liquid;

a first tank having flexibility, the first tank being positioned lower than the first reservoir;

a second tank having a flexibility, the second tank being positioned lower than the second reservoir;

a first valve configured to open and close a channel connecting the first reservoir and the first tank;

a second valve configured to open and close a channel connecting the second reservoir and the second tank;

a head, the first liquid being capable of flowing into the head from the first tank through a first channel, the second liquid being capable of flowing into the head from the second tank through a second channel;

a suction mechanism configured to drive so that a suction pressure is applied to the first channel and the second channel from a head side, of the first channel and the second channel, at which the head is positioned;

a first sensor;

a second sensor; and a controller.

The controller is configured to:

execute a valve-opening operation of opening the first valve and the second valve, in response to receiving of a suction instruction;

execute, after executing the valve-opening operation, a valve-closing operation of closing the first valve depending on output of a first signal from the first sensor, and closing the second valve depending on output of a second signal from the second sensor, the first signal being a signal indicating that an amount of the first liquid in the first tank is a first threshold value or more, the second signal being a signal indicating that an amount of the second liquid in the second tank is a second threshold value or more; and execute, after executing the valve-closing operation, a suction operation of driving the suction mechanism for a predetermined time period.

According to the liquid supply device described above, in the liquid supply device configured to perform suction to introduce the liquid into the plurality of channels connecting the plurality of reservoirs and the head, the suction mechanism is driven in a state where the liquid of not less than the predetermined amount has been supplied to each of the tanks, and supply of the liquid to each of the tanks from each of the reservoirs then has been stopped. Therefore, difference in liquid amounts flowing into the head through the plurality of channels by suction becomes smaller.

(2) According to another aspect of the present disclosure, the controller may be configured to execute, after executing the suction operation, the valve-opening operation again.

(3) According to another aspect of the present disclosure, the controller may be configured to open the first valve depending on output of a third signal from the first sensor, and open the second valve depending on output of a fourth signal from the second sensor, the third signal being a signal indicating that the amount of the first liquid in the first tank is less than a third threshold value smaller than the first threshold value, the fourth signal being a signal indicating that the amount of the second liquid in the second tank is less than a fourth threshold value smaller than the second threshold value.

(4) According to another aspect of the present disclosure, the first sensor may include a first signal outputting sensor configured to output the first signal and a third signal outputting sensor configured to output the third signal, and the second sensor may include a second signal outputting sensor configured to output the second signal and a fourth signal outputting sensor configured to output the fourth signal.

(5) According to another aspect of the present disclosure, the controller may be configured to repeatedly execute the valve-opening operation, the valve-closing operation, and the suction operation a predetermined number of times, in response to the suction instruction.

(6) According to another aspect of the present disclosure, the controller may be configured to keep the first valve in a closed state in the valve-opening operation, after executing the valve-opening operation, the valve-closing operation, and the suction operation a certain number of times fewer than the predetermined number of times.

(7) According to another aspect of the present disclosure, the controller may be configured to execute the valve-opening operation again, after having repeatedly executed the valve-opening operation, the valve-closing operation, and the suction operation the predetermined number of times.

(8) According to another aspect of the present disclosure, the suction device may suck each of the first liquid and the second liquid as much as a predetermined amount by being driven for the predetermined time period, and the predetermined amount is larger than a volume of the first tank and a volume of the second tank.

(9) According to another aspect of the present disclosure, the controller may be configured to: execute a recording operation of discharging the first liquid and the second liquid from the head, in a state that the first valve and the second valve are closed; execute a first valve opening and closing operation of opening the first valve depending on output of a third signal from the first sensor, and closing the first valve depending on output of the first signal from the first sensor after the outputting of the third signal, the third signal being a signal indicating that the amount of the first liquid in the first tank is less than a third threshold value smaller than the first threshold value; execute a second valve opening and closing operation of opening the second valve depending on output of a fourth signal from the second sensor, and closing the second valve depending on output of the second signal from the second sensor after the outputting of the fourth signal, the fourth signal being a signal indicating that the amount of the second liquid in the second tank is less than a fourth threshold value smaller than the second threshold value; and stop the first valve opening and closing operation and the second valve opening and closing operation in response to the receiving of the suction instruction until completion of the executing of the suction operation.

(10) According to another aspect of the present disclosure, the first sensor may include a first signal outputting sensor configured to output the first signal and a third signal outputting sensor configured to output the third signal, and the second sensor may include a second signal outputting sensor configured to output the second signal and a fourth signal outputting sensor configured to output the fourth signal.

(11) An image recording device according to another aspect of the present disclosure includes: the liquid supply device as described in any one of (1) to (10); and a conveyer configured to convey a recording medium to which the first liquid and the second liquid are to be discharged from the head.

(12) A method of supplying liquid according to another aspect of the present disclosure is a method of supplying liquid using a first reservoir configured to store a first liquid; a second reservoir configured to store a second liquid; a first tank which has a flexibility and which is positioned lower than the first reservoir; a second tank which has a flexibility and which is positioned lower than the second reservoir; and a head, the first liquid being capable of flowing into the head from the first tank through a first channel, the second liquid being capable of flowing into the head from the second tank through a second channel.

The method includes:

opening a first valve configured to open and close a channel connecting the first reservoir and first tank, and opening a second valve configured to open and close a channel connecting the second reservoir and the second tank, in response to receiving of a suction instruction;

after the opening of the first valve and the second valve, closing the first valve depending on output of a first signal from a first sensor, and closing the second valve depending on output of a second signal from a second sensor, the first signal being a signal indicating that an amount of the first liquid in the first tank is a first threshold value or more, the second signal being a signal indicating that an amount of the second liquid in the second tank is a second threshold value or more; and after the closing of the first valve and the second valve, driving a suction mechanism for a predetermined time period, the suction mechanism being configured to drive so that a suction pressure is applied to the first channel and the second channel from a head side, of the first channel and the second channel, at which the head is positioned.

The present disclosure results in difference in liquid amounts flowing into a head through a plurality of channels by suction becoming smaller.

Figure 5A:
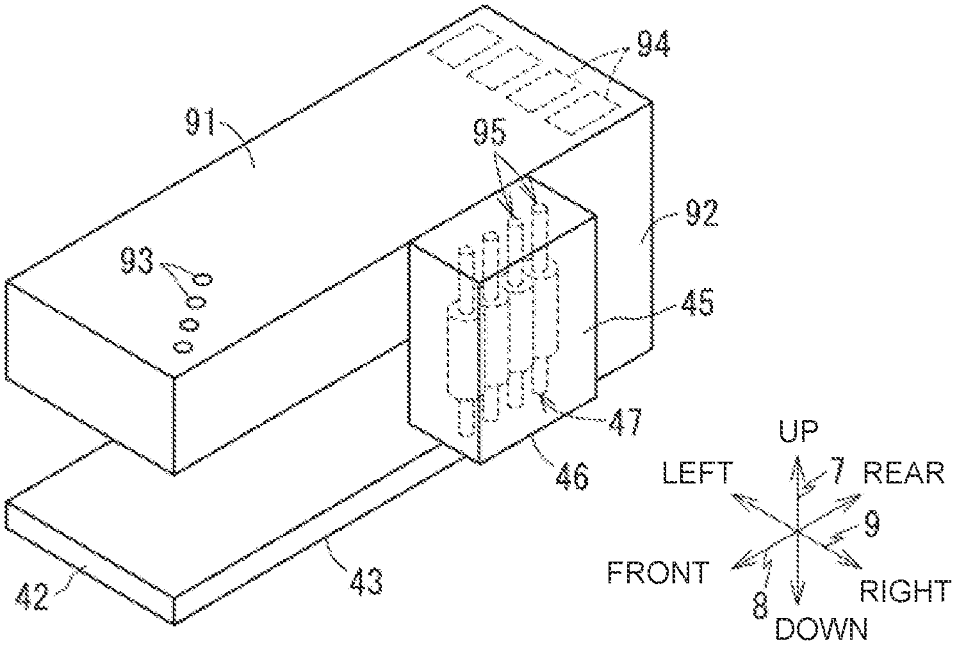
Figure 5B:
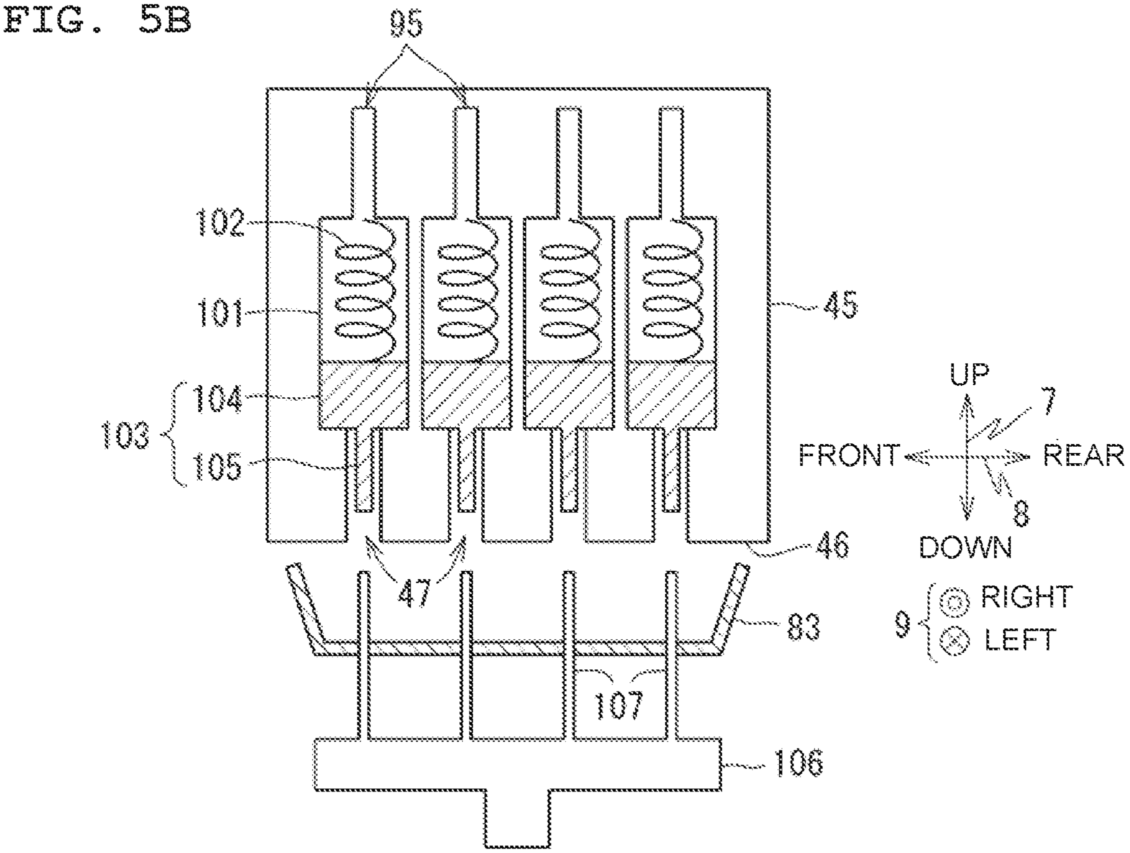

FIGS. 5A and 5B are diagrams each depicting configuration of a head 42 and its periphery. FIG. 5A is a perspective view of the head 42 and its periphery. FIG. 5B is a cross-sectional view of an exhaust portion 45.

Figure 6:
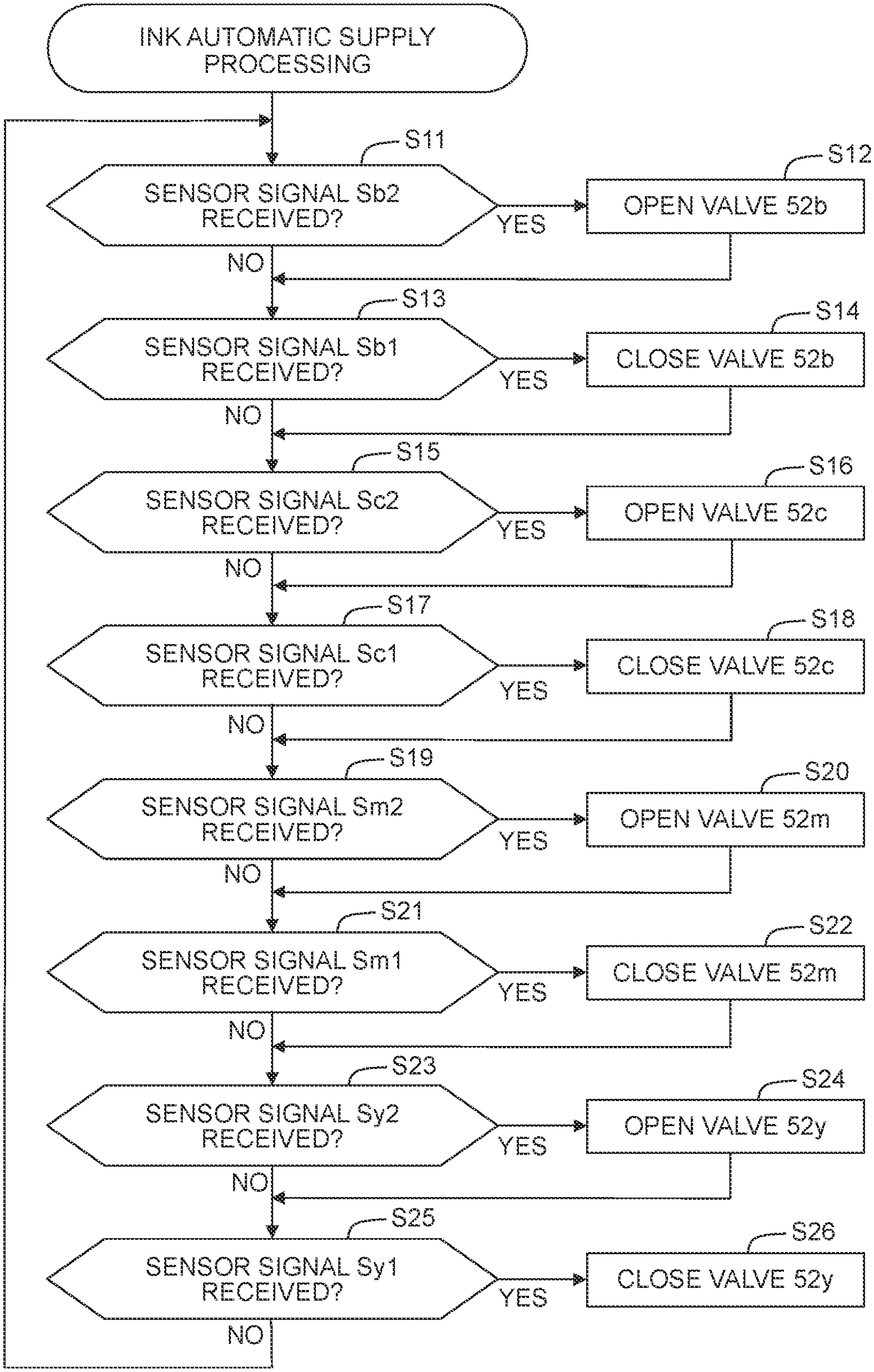

FIG. 6 is a flowchart of ink automatic supply processing by the controller 60.

Figure 7:
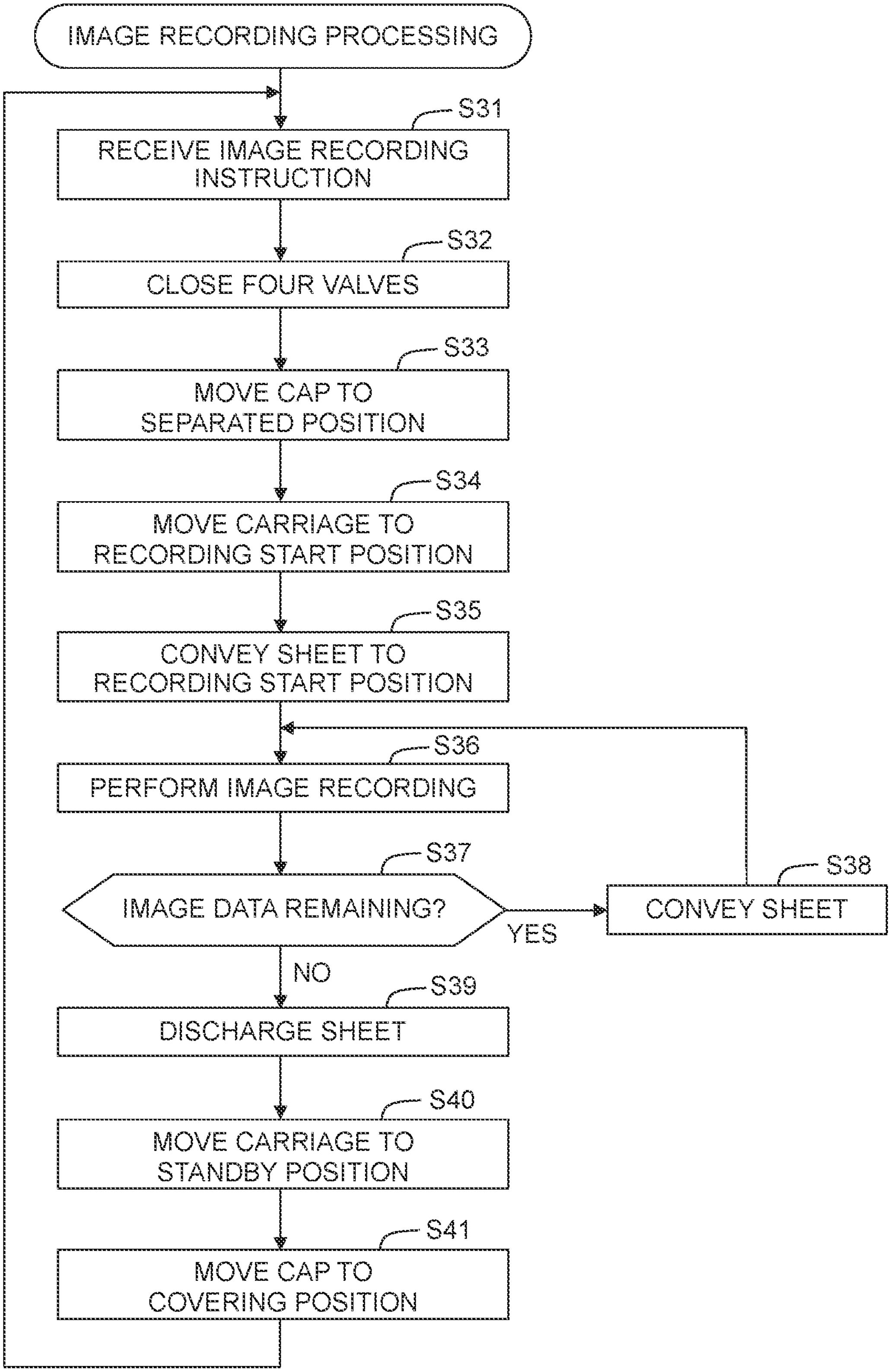

FIG. 7 is a flowchart of image recording processing by the controller 60.

Figure 8:
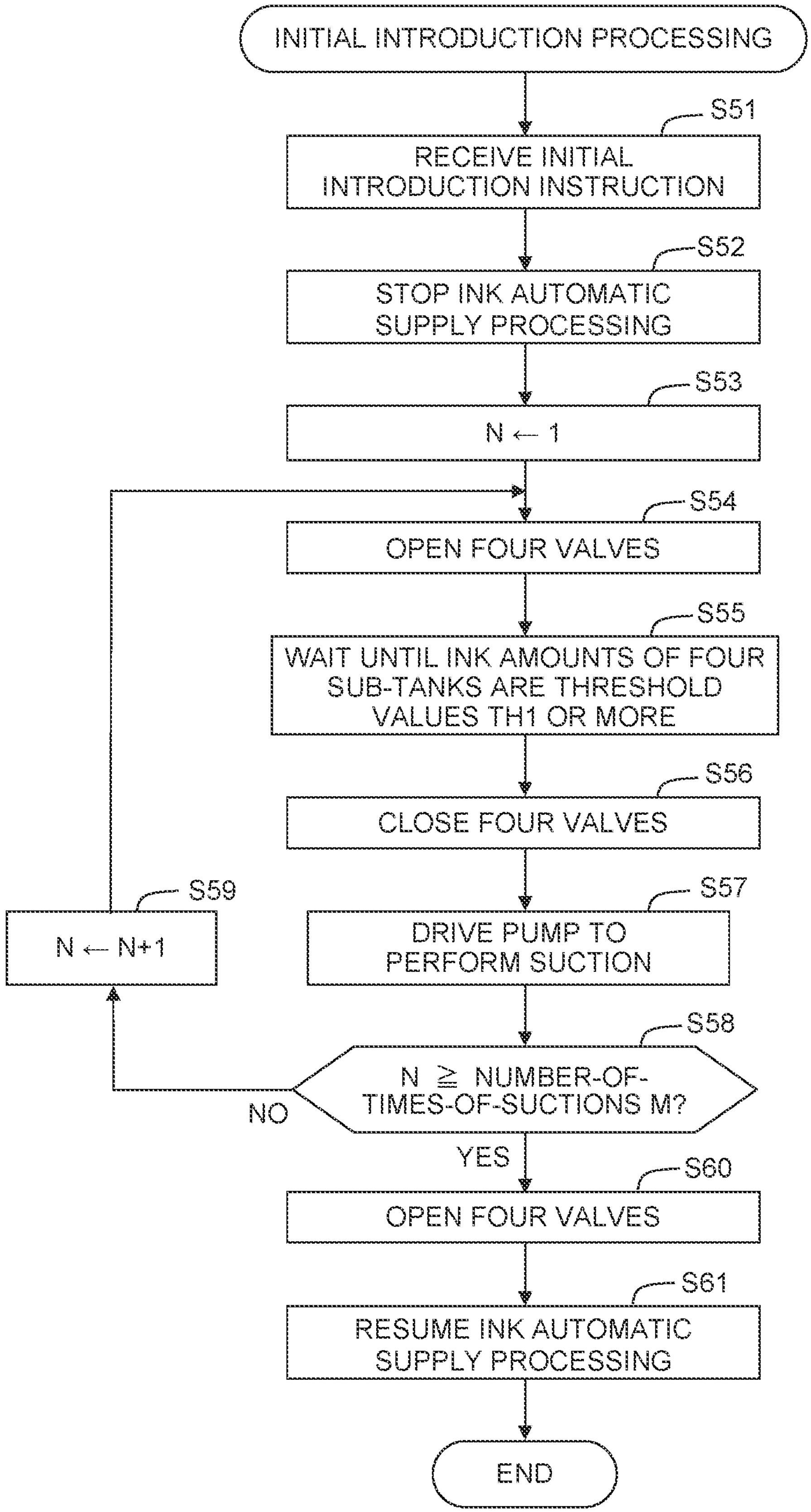

FIG. 8 is a flowchart of initial introduction processing by the controller 60.

Figure 9:
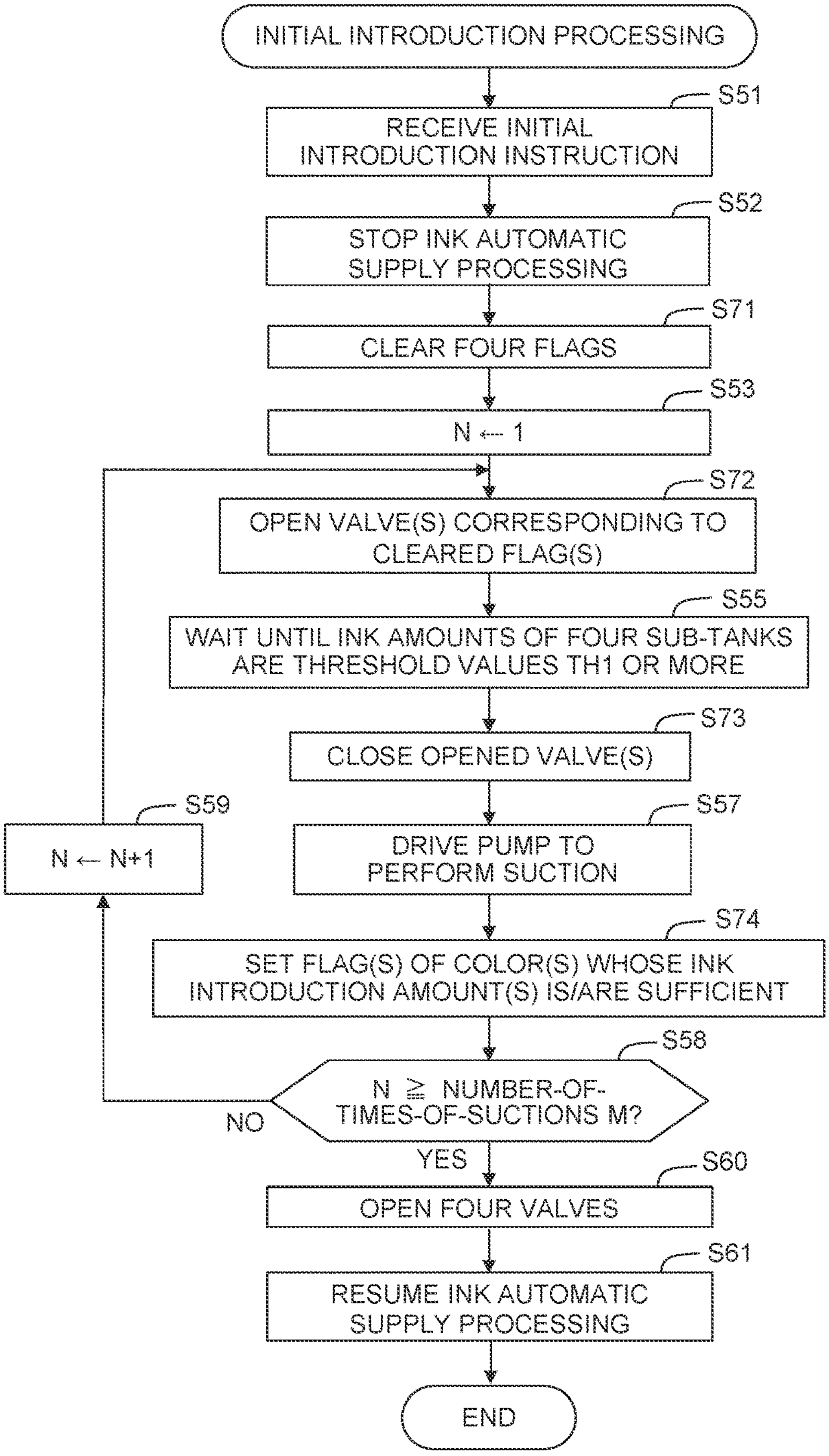

FIG. 9 is a flowchart of initial introduction processing by a controller 60.

A printer 10 (one example of an image recording device) and ink supply unit 50 (one example of a liquid supply device) according to an embodiment of the present disclosure will be described below. Note that the embodiment described below is merely one example of the present disclosure, and it goes without saying that the embodiment of the present disclosure can be appropriately altered in a range not altering the gist of the present disclosure. In the description below, progression from a start point to an end point of an arrow will be expressed as orientation, and coming and going on a line connecting a start point and an end point of an arrow will be expressed as direction. Moreover, an up-down direction 7 is defined with reference to a state of the printer 10 having been usably installed (the state of FIG. 1), a front-rear direction 8 is defined assuming a surface provided with a discharge port 13 to be a front surface, and a left-right direction 9 is defined looking at the printer 10 from the front. The up-down direction 7, the front-rear direction 8, and the left-right direction 9 are orthogonal to each other.

[Overall Configuration of Printer 10]

Figure 1:
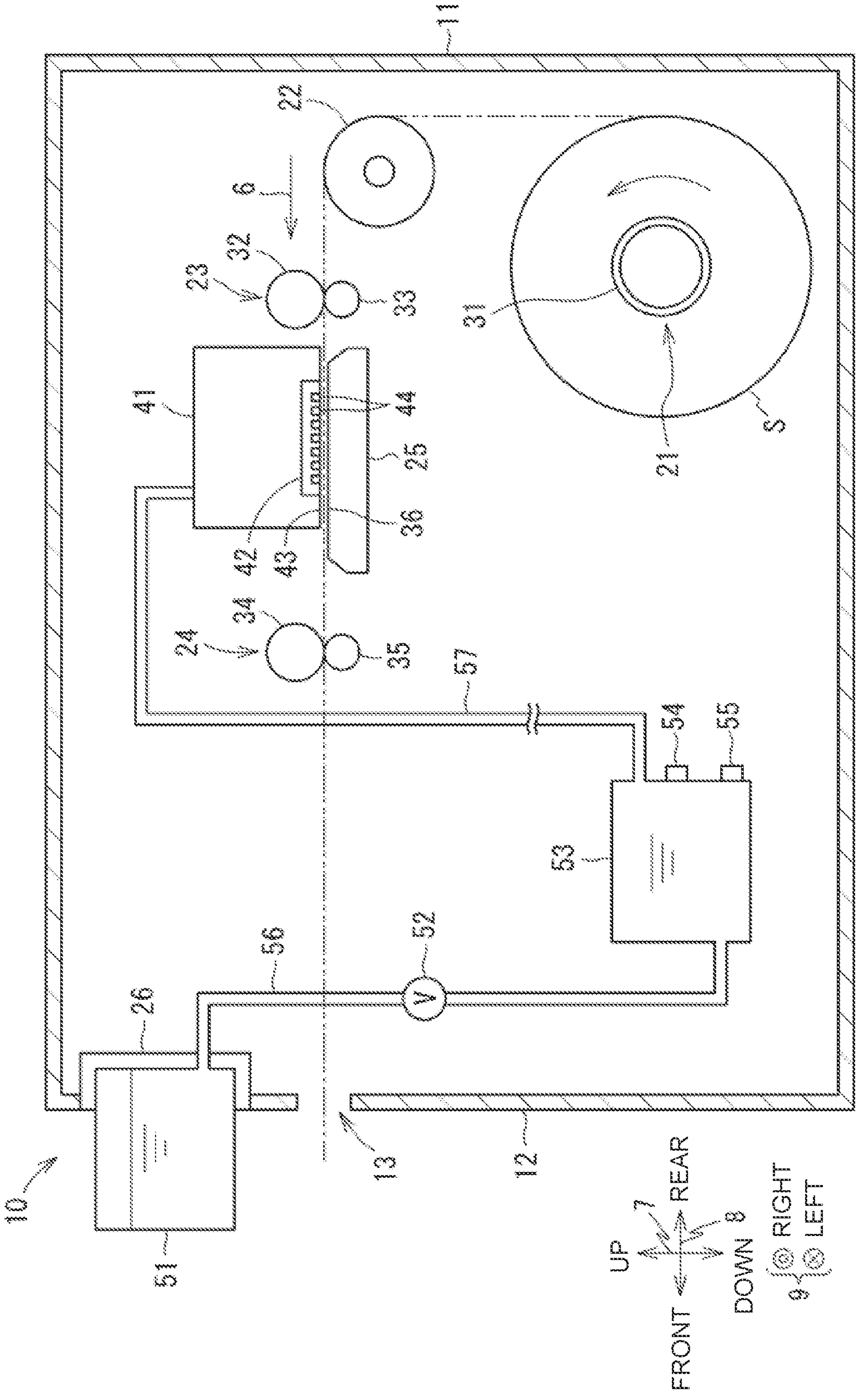
FIG. 1 is a schematic view depicting internal configuration of a printer 10.

The printer 10 depicted in FIG. 1 is an image recording device that records an image on a sheet S (one example of a recording medium) by an ink jet recording system. The sheet S is a long paper sheet that has been wound into a roll shape. In order for the sheet S to be mounted in the printer 10, a winding center of the sheet S has a through-hole formed therein. A recording objective medium may be the likes of a seal paper, fan-fold paper, cut paper, or a fabric.

The printer 10 comprises a housing 11 of substantially rectangular parallelepiped shape. The housing 11 has a size enabling it to be mounted on a tabletop, on a floor, or in a rack, and so on. Located in a front wall 12 of the housing 11 is the discharge port 13 which is slit-like and extends in the left-right direction 9. The sheet S that has been recorded with an image by the printer 10 is discharged from the discharge port 13. The discharged sheet S is wound by a winding device (not depicted) fitted to the printer 10, for example.

Figure 2:
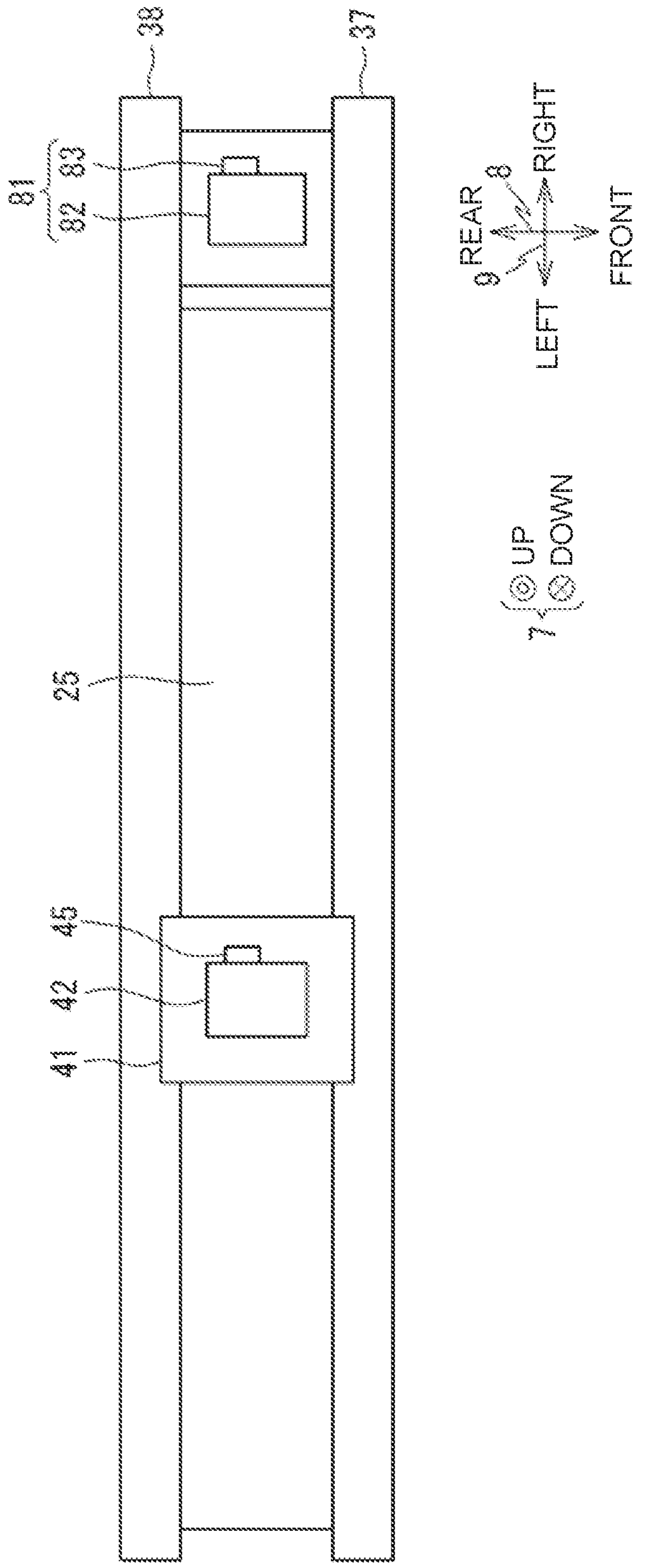
FIG. 2 is a diagram depicting a moving range of a carriage 41.
Figure 3:
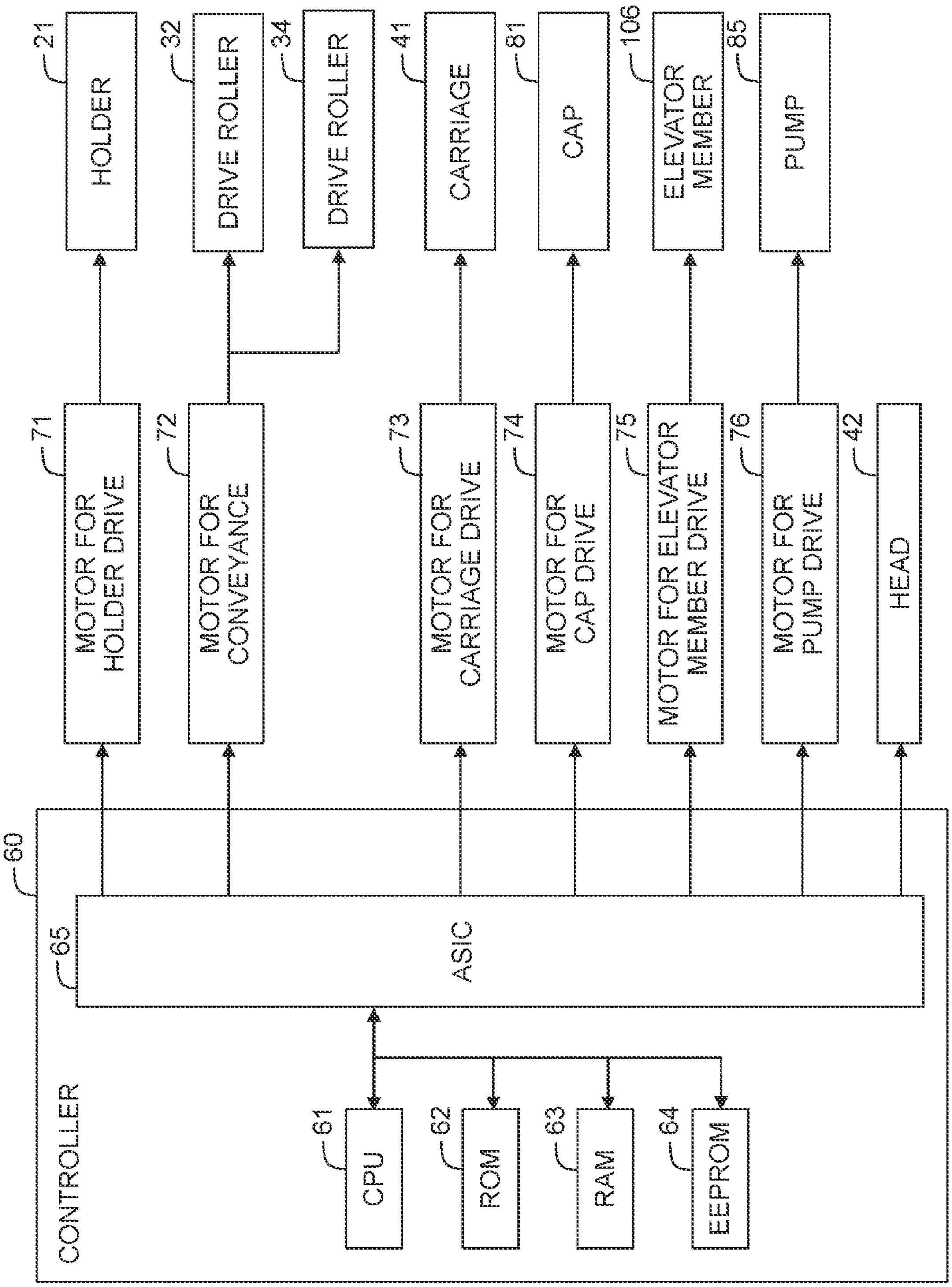
FIG. 3 is a block diagram depicting configuration of a controller 60 and elements connected to the controller 60.
Figure 4:
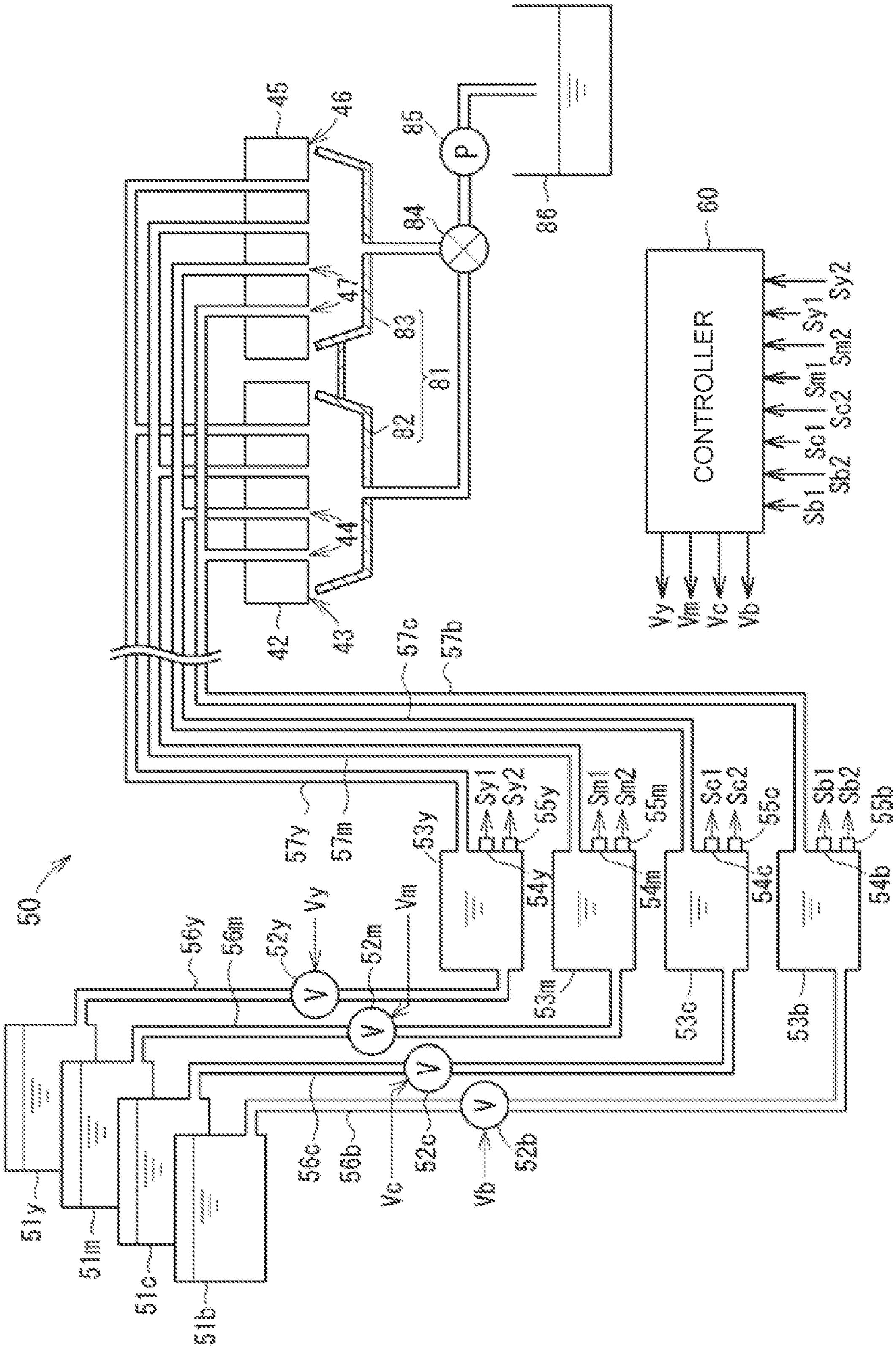
FIG. 4 is a schematic view depicting configuration of an ink supply unit 50.

As depicted in FIG. 1, the printer 10 comprises the following within the housing 11, namely, a holder 21, a tensioner 22, a conveying roller pair 23, a discharging roller pair 24, a platen 25, a cartridge holder 26, a carriage 41, a head 42, and the ink supply unit 50 (see FIG. 4). The head 42 is installed in the carriage 41. The cartridge holder 26 is fitted with a cartridge 51 that stores ink (one example of a liquid). As depicted in FIG. 2, the printer 10 further comprises the following within the housing 11, namely, two guide rails 37, 38 and a cap 81. As depicted in FIG. 3, the printer 10 further comprises the following within the housing 11, namely, a controller 60, a motor for holder drive 71, a motor for conveyance 72, a motor for carriage drive 73, and a motor for cap drive 74. The printer 10 may further comprise a wipe unit, various kinds of motors, various kinds of sensors, and so on, besides the above-mentioned elements.

[Conveying Mechanism of Sheet S]

Located inside the housing 11 are a pair of side frames (not depicted) that extend in the up-down direction 7 and the front-rear direction 8. The holder 21 has a rotating shaft 31 that supports the sheet S. The rotating shaft 31 extends in the left-right direction 9 and has its two ends fixed to the side frames. Motive power of the motor for holder drive 71 (see FIG. 3) is transmitted to the rotating shaft 31. This motive power causes the holder 21 to rotate in a circumferential direction of the rotating shaft 31. In FIG. 1, a rotating direction of the holder 21 is counter-clockwise. Rotation of the holder 21 causes a roll body supported by the holder 21 to rotate too. The sheet S is led out upwardly from a rear end of the roll body and guided to the tensioner 22 as a result of the conveying roller pair 23 and discharge roller pair 24 rotating.

The tensioner 22, the conveying roller pair 23, and the discharge roller pair 24 each extend in the left-right direction 9 between the side frames and are installed in a manner enabling them to rotate in a circumferential direction of their rotational axes parallel to the left-right direction 9. The tensioner 22 is applied with a biasing force in a rearward orientation by a biasing member such as a spring. The tensioner 22 abuts on the sheet S led out from the roll body and thereby guides the sheet S in such a manner that the sheet S curves frontwards.

The conveying roller pair 23 include a drive roller 32 and a pinch roller 33, and are located forward of the tensioner 22. The discharge roller pair 24 include a drive roller 34 and a pinch roller 35, and are located further forward than the conveying roller pair 23. Lower end positions of the drive rollers 32, 34 substantially coincide with an upper end position of the tensioner 22 in the up-down direction 7. The pinch roller 33 abuts from below on the drive roller 32. The pinch roller 35 abuts from below on the drive roller 34.

Motive power of the motor for conveyance 72 (see FIG. 3) is transmitted to the drive rollers 32, 34. This motive power causes the drive rollers 32, 34 to rotate. As a result, the drive rollers 32, 34 convey the sheet S in a conveying orientation 6 while nipping the sheet S between the drive roller 32 and the pinch roller 33 as well as between the drive roller 34 and the pinch roller 35. In the present embodiment, the conveying orientation 6 is a frontward orientation. The motor for conveyance 72, the conveying roller pair 23, and the discharge roller pair 24 function as a conveyer (conveying unit) that conveys the sheet S to which ink discharged from the head 42 lands.

[Platen 25]

The platen 25 is fitted to the side frames at a position between the conveying roller pair 23 and discharge roller pair 24 in the front-rear direction 8. The platen 25 extends in the left-right direction 9 between the side frames, and includes a supporting surface 36 for the sheet S, that extends in the front-rear direction 8 and the left-right direction 9. The supporting surface 36 is an upper end surface of the platen 25. A position in the up-down direction 7 of the supporting surface 36 substantially coincides with the upper end position of the tensioner 22. The platen 25 may be a sucking platen that sucks the sheet S onto the supporting surface 36.

[Carriage 41 and Head 42]

As depicted in FIG. 2, the guide rails 37, 38 extend in the left-right direction 9 parallelly to each other. Positions in the up-down direction 7 of the guide rails 37, 38 are the same. The guide rail 38 is located rearward of the guide rail 37 in the front-rear direction 8. Both ends of the guide rails 37, 38 are fixed to the side frames. The carriage 41 is supported by the guide rails 37, 38. Motive power of the motor for carriage drive 73 (see FIG. 3) is transmitted to a carriage drive mechanism (not depicted). The carriage 41 moves in the left-right direction 9 due to action of the carriage drive mechanism, in a state of being supported by the guide rails 37, 38.

As depicted in FIG. 1, the head 42 is installed in the carriage 41. A lower surface of the head 42 is referred to as a nozzle surface 43. A plurality of nozzles 44 each configured to discharge ink is located in the nozzle surface 43. The cartridge 51 fitted to the cartridge holder 26, and the head 42 are connected via the ink supply unit 50 (see FIG. 4). Ink stored in the cartridge 51 is supplied to the head 42 via the ink supply unit 50. While the carriage 41 is moving in the left-right direction 9, ink that has been supplied to the head 42 is discharged from the nozzles 44. As a result, image recording is performed on the sheet S.

[Controller 60]

As depicted in FIG. 3, the controller 60 has a CPU 61, a ROM 62, a RAM 63, an EEPROM 64, and an ASIC 65. The ROM 62 stores the likes of various kinds of data required in operation of the controller 60. The RAM 63 is a working memory of the CPU 61. The EEPROM 64 stores the likes of a control program executed by the CPU 61. Prior to image recording being executed by the printer 10, the control program stored in the EEPROM 64 is copied to the RAM 63. The CPU 61 executes the control program stored in the RAM 63. As a result, the controller 60 executes ink automatic supply processing, image recording processing, and initial introduction processing that will be described later. The controller 60 is one example of a controller.

The controller 60 is electrically connected to the motor for holder drive 71, the motor for conveyance 72, the motor for carriage drive 73, the motor for cap drive 74, a motor for elevator member drive 75, a motor for pump drive 76, and the head 42, via the ASIC 65. The motor for holder drive 71, the motor for conveyance 72, the motor for carriage drive 73, the motor for cap drive 74, the motor for elevator member drive 75, and the motor for pump drive 76 rotate according to control from the controller 60, and generate motive power. The head 42 discharges ink onto the sheet S conveyed on the platen 25, according to control from the controller 60.

The holder 21 rotates due to motive power from the motor for holder drive 71. The drive rollers 32, 34 rotate due to motive power from the motor for conveyance 72. The sheet S is conveyed in the conveying orientation 6 due to motive power from the motor for conveyance 72. The carriage 41 moves in the left-right direction 9 due to motive power from the motor for carriage drive 73. The cap 81 moves in the up-down direction 7 between a relatively high covering position and a relatively low separated position, due to motive power from the motor for cap drive 74. An elevator member 106 (see FIG. 5B; details described later) moves in the up-down direction 7 between a relatively high abutting position and a relatively low non-abutting position, due to motive power from the motor for elevator member drive 75. A pump 85 (see FIG. 4), which is driven by motive power from the motor for pump drive 76, provides a suction pressure to a channel connected to the pump 85. Note that some of the motor for holder drive 71, the motor for conveyance 72, the motor for carriage drive 73, the motor for cap drive 74, the motor for elevator member drive 75, and the motor for pump drive 76 may be realized by a common motor.

[Moving Range of Carriage 41, and Cap 81]

As depicted in FIG. 2, the platen 25, which has a shape long in the left-right direction 9, is located below the carriage 41 in the up-down direction 7 (see FIG. 1). A left end of the platen 25 is located close to left ends of the guide rails 37, 38 in the left-right direction 9. A right end of the platen 25 is located further to the right than centers of the guide rails 37, 38 in the left-right direction 9. The cap 81 is located to the right of the platen 25 in the left-right direction 9. While image recording is being executed by the printer 10, the carriage 41 moves in the left-right direction 9 within a range of the platen 25. While image recording is not being executed by the printer 10, the carriage 41 is located in a position where the head 42 faces the cap 81 (hereafter, referred to as a standby position).

As depicted in FIG. 4, the cap 81 includes: a nozzle cap 82 configured to cover the nozzle surface 43 of the head 42; and an exhaust cap 83 configured to cover an exhaust port surface 46 of an exhaust portion 45 (details of which will be described later). When the carriage 41 is located in the standby position, the cap 81 is located in the covering position. At this time, the nozzle cap 82 covers the nozzle surface 43 of the head 42, and the exhaust cap 83 covers the exhaust port surface 46 of the exhaust portion 45. When the carriage 41 is located in a position other than the standby position, the cap 81 is located in the separated position. At this time, the nozzle cap 82 does not cover the nozzle surface 43, and the exhaust cap 83 does not cover the exhaust port surface 46. In this way, the cap 81 has a function of covering the nozzle surface 43 and the exhaust port surface 46 in a time period in which image recording is not executed.

[Ink Supply Unit 50]

The ink supply unit 50 of the printer 10 will be described with reference to FIG. 4. The cartridge holder 26 (see FIG. 1) is installed with four cartridges 51*b*, 51*c*, 51*m*, 51*y* that respectively store black, cyan, magenta, and yellow inks. The ink supply unit 50 comprises the cartridges 51*b*, 51*c*, 51*m*, 51*y*, four valves 52*b*, 52*c*, 52*m*, 52*y*, four sub-tanks 53*b*, 53*c*, 53*m*, 53*y*, eight sensors 54*b*, 54*c*, 54*m*, 54*y*, 55*b*, 55*c*, 55*m*, 55*y*, the head 42, the pump 85, and the controller 60.

The inks stored in the cartridges 51*b*, 51*c*, 51*m*, 51*y*, which are so-called latex inks, contain a pigment, resin fine particles, and an additive. The ink has a viscosity suitable for evenly dispersing the pigment and the resin fine particles. The pigment represents the color of the ink. The resin fine particles, which are for causing the pigment to adhere to the sheet S, are of a synthetic resin whose glass transition temperature is exceeded by heating of a heater (not depicted), for example. Note that the printer 10 may be installable with at least two cartridges, and may have at least two sub-tanks.

An ink channel 56*b* connects the cartridge 51*b* and the sub-tank 53*b*. An ink channel 56*c* connects the cartridge 51*c* and the sub-tank 53*c*. An ink channel 56*m* connects the cartridge 51*m* and the sub-tank 53*m*. An ink channel 56*y* connects the cartridge 51*y* and the sub-tank 53*y*. An ink channel 57*b* connects the sub-tank 53*b* and the head 42. An ink channel 57*c* connects the sub-tank 53*c* and the head 42. An ink channel 57*m* connects the sub-tank 53*m* and the head 42. An ink channel 57*y* connects the sub-tank 53*y* and the head 42.

The ink stored in the cartridge 51*b* is supplied to the sub-tank 53*b* via the ink channel 56*b*. The sub-tank 53*b* stores the ink that has been supplied from the cartridge 51*b*. The ink stored in the sub-tank 53*b* is supplied to the head 42 via the ink channel 57*b*. Similarly, the ink stored in the cartridge 51*c* is supplied to the head 42 via the ink channel 56*c*, the sub-tank 53*c*, and the ink channel 57*c*. The ink stored in the cartridge 51*m* is supplied to the head 42 via the ink channel 56*m*, the sub-tank 53*m*, and the ink channel 57*m*. The ink stored in the cartridge 51*y* is supplied to the head 42 via the ink channel 56*y*, the sub-tank 53*y*, and the ink channel 57*y*.

The sub-tanks 53*b*, 53*c*, 53*m*, 53*y* are flexible. Outer shapes of the sub-tanks 53*b*, 53*c*, 53*m*, 53*y* change between an expanded (swollen) state and a contracted (shrunken) state depending on an amount of ink stored therein. The sub-tank 53*b* is located in a lower position than the cartridge 51*b*. Supply of ink from the cartridge 51*b* to the sub-tank 53*b* is performed by water head difference. Supply of ink from the sub-tank 53*b* to the head 42 is initially performed by sucking the ink from the head 42 side by the pump 85. Subsequently, the same amount of ink as ink that has been discharged from the head 42 is supplied to the head 42 from the sub-tank 53*b*. Supply of ink from the sub-tanks 53*c*, 53*m*, 53*y* to the head 42 is performed by a similar method too.

The black ink can flow into the head 42 through the ink channel 57*b* from the sub-tank 53*b*, the cyan ink can flow into the head 42 through the ink channel 57*c* from the sub-tank 53*c*, the magenta ink can flow into the head 42 through the ink channel 57*m* from the sub-tank 53*m*, and the yellow ink can flow into the head 42 through the ink channel 57*y* from the sub-tank 53*y*. The ink supply unit 50 has four ink channels (an ink channel for black ink, an ink channel for cyan ink, an ink channel for magenta ink, and an ink channel for yellow ink) between the cartridges 51*b*, 51*c*, 51*m*, 51*y* and the head 42.

The sensors 54*b*, 55*b*, which are located on an inside or an outside of the sub-tank 53*b*, detect ink amount of the sub-tank 53*b*. The sensor 54*b* outputs a sensor signal Sb1 indicating that ink amount of the sub-tank 53*b* (amount of the ink in the sub-tank 53*b*) is a threshold value TH1 or more. The sensor 55*b* outputs a sensor signal Sb2 indicating that ink amount of the sub-tank 53*b* is less than a threshold value TH2. Similarly, the sensors 54*c*, 54*m*, 54*y* respectively output sensor signals Sc1, Sm1, Sy1 indicating that ink amounts of the sub-tanks 53*c*, 53*m*, 53*y* are the threshold values TH1 or more. The sensors 55*c*, 55*m*, 55*y* respectively output sensor signals Sc2, Sm2, Sy2 indicating that ink amounts of the sub-tanks 53*c*, 53*m*, 53*y* are less than the threshold values TH2.

Each of sensors 54*b*, 54*c*, 54*m*, 54*y*, 55*b*, 55*c*, 55*m*, 55*y* detects ink amount of one of sub-tanks 53*b*, 53*c*, 53*m*, 53*y* corresponding thereto by an arbitrary method. Each sensor may detect ink amount of the one of the sub-tanks 53*b*, 53*c*, 53*m*,53*y* corresponding thereto by optically detecting change in outer shape of the one of the sub-tanks 53*b*, 53*c*, 53*m*, 53*y* corresponding thereto, for example. Each sensor may detect ink amount of the one of the sub-tanks 53*b*, 53*c*, 53*m*, 53*y* corresponding thereto by a publicly known float system, prism system, or electrode system. The threshold values TH2 employed in comparison with ink amounts by the sensors 55*b*, 55*c*, 55*m*, 55*y* are respectively smaller than the threshold values TH1 employed in comparison with ink amounts by the sensors 54*b*, 54*c*, 54*m*, 54*y*. The threshold values employed in comparison with ink amounts by the sensors 54*b*, 54*c*, 54*m*, 54*y* are not necessarily all the same value, and there may be threshold value(s) whose value(s) is different from a value of the other threshold value of the four threshold values. The threshold values employed in comparison with ink amounts by the sensors 55*b*, 55*c*, 55*m*, 55*y* are not necessarily all the same value, and there may be threshold value(s) whose value(s) is different from a value of the other threshold value of the four threshold values.

The controller 60 is inputted with the sensor signals Sb1, Sc1, Sm1, Sy1, Sb2, Sc2, Sm2, Sy2 that have been respectively outputted from the sensors 54*b*, 54*c*, 54*m*, 54*y*, 55*b*, 55*c*, 55*m*, 55*y*. The controller 60 outputs a control signal Vb of the valve 52*b*, a control signal Vc of the valve 52*c*, a control signal Vm of the valve 52*m*, and a control signal Vy of the valve 52*y*, based on the sensor signals the controller has been inputted with. The control signals Vb, Vc, Vm, Vy are binary signals for switching states of the valves 52 between an open state and a closed state.

The valve 52*b*, which is located on the ink channel 56*b*, opens and closes the ink channel 56*b* according to the control signal Vb. The valve 52*c*, which is located on the ink channel 56*c*, opens and closes the ink channel 56*c* according to the control signal Vc. The valve 52*m*, which is located on the ink channel 56*m*, opens and closes the ink channel 56*m* according to the control signal Vm. The valve 52*y*, which is located on the ink channel 56*y*, opens and closes the ink channel 56*y* according to the control signal Vy.

The ink channel 57*b* branches on its head 42 side into a portion reaching the nozzle 44 of the head 42 and portion reaching an exhaust port 47 of the exhaust portion 45. An inner space of the nozzle cap 82 is connected to a first end of a switching portion 84. An inner space of the exhaust cap 83 is connected to a second end of the switching portion 84. A third end of the switching portion 84 is connected to one end of the pump 85. A waste liquid tank 86 is located on the other end side of the pump 85. The switching portion 84 switches which of the inner space of the nozzle cap 82 and inner space of the exhaust cap 83 the pump 85 is to be connected to, by control from the controller 60. The pump 85 is one example of a suction mechanism applying a suction pressure to the ink channels 57*c*, 57*b*, 57*m*, 57*y* from the head 42 side.

[Exhaust Portion 45]

As depicted in FIG. 5A, a buffer 91 having an inner space (not depicted) configured to store a small amount of ink, is located in an upper portion of the head 42. The buffer 91 and the head 42 are connected by a coupling portion 92 extending in the up-down direction 7. The exhaust portion 45, which is of rectangular parallelepiped shape, is located on a right side of the buffer 91. The exhaust port surface 46, which is a lower surface of the exhaust portion 45, is located in a higher position than the nozzle surface 43 in the up-down direction 7. Four exhaust ports 47 are located in the exhaust port surface 46. The four exhaust ports 47 are aligned at a predetermined interval in the front-rear direction 8.

Four ink inflow ports 93 are located in an upper surface of the buffer 91. The four ink inflow ports 93 are respectively connected to ink tubes (not depicted) configuring parts of the ink channels 57*b*, 57*c*, 57*m*, 57*y*. Four coupling channels 94 are located in a rear portion of the coupling portion 92. The four coupling channels 94 extend in the up-down direction 7 and are aligned in the left-right direction 9. Four connecting portions 95 are located in an upper portion of the exhaust portion 45. The four ink inflow ports 93 are respectively connected to the four coupling channels 94 via four ink channels (not depicted) in the buffer 91. Ink that has reached the ink inflow port 93 passes along the ink channels in the buffer 91 and coupling channels 94 to reach the head 42 and be discharged in a downward orientation from the nozzles 44 located in the nozzle surface 43.

The four coupling channels 94 are respectively connected to the four connecting portions 95 too, via another four ink channels (not depicted) in the buffer 91. The four connecting portions 95 are respectively connected to the four exhaust ports 47 via four channels along which mainly gas flows. As depicted in FIG. 5B, the channel connecting the connecting portion 95 and the exhaust port 47 has a diameter enlarged portion 101. A spring 102 and valve body 103 are located in an inner space of the diameter enlarged portion 101. The valve body 103 has a main body portion 104 and a projecting portion 105. The main body portion 104, which has an outer diameter substantially equal to an inner diameter of the diameter enlarged portion 101, is located within the diameter enlarged portion 101. The projecting portion 105, which has an outer diameter smaller than the inner diameter of the diameter enlarged portion 101, projects downwardly toward the exhaust port 47 from the diameter enlarged portion 101. The spring 102, which is located above the valve body 103, biases the valve body 103 in a downward orientation. In a normal state, the main body portion 104 is pressed onto a bottom surface of the diameter enlarged portion 101 by action of the spring 102, and the four exhaust ports 47 are in a closed state.

Located below the exhaust cap 83 is the elevator member 106. The elevator member 106 has four abutting portions 107. The four abutting portions 107, which have shapes projecting in an upward orientation, are aligned at a predetermined interval in the front-rear direction 8. Four through-holes are located in a bottom surface of the exhaust cap 83. The four through-holes are aligned at a predetermined interval in the front-rear direction 8. The interval of the four exhaust ports 47, the interval of the four abutting portions 107, and the interval of the four through-holes of the exhaust cap 83 are all the same. The four abutting portions 107 respectively penetrate the four through-holes of the exhaust cap 83.

As described above, the elevator member 106 is capable of moving in the up-down direction 7 between the relatively high abutting position and the relatively low non-abutting position, due to motive power from the motor for elevator member drive 75. The elevator member 106 is capable of moving in the up-down direction 7, independently of the exhaust cap 83. When the carriage 41 is located in the standby position and the elevator member 106 is located in the abutting position, the four abutting portions 107 respectively abut on the four projecting portions 105. At this time, the four valve bodies 103 move in an upward orientation against a restoring force of the spring 102, and separate from the bottom surface of the diameter enlarged portion 101. Hence, the four exhaust ports 47 attain an open state.

When the carriage 41 is located in the standby position and the elevator member 106 is located in the non-abutting position, the exhaust ports 47 attain a closed state. By the inner space of the nozzle cap 82 and the pump 85 being connected by the switching portion 84, and the pump 85 thereupon being driven under such condition, the ink channels 57*b*, 57*c*, 57*m*, 57*y* are provided with a suction pressure from the head 42 side. As a result, ink and gas in the ink channels 57*b*, 57*c*, 57*m*, 5'7*y* is discharged from the nozzles 44. The ink that has been discharged from the nozzles 44 is stored in the waste liquid tank 86.

When the carriage 41 is located in the standby position and the elevator member 106 is located in the abutting position, the exhaust ports 47 attain an open state. By the inner space of the exhaust cap 83 and the pump 85 being connected by the switching portion 84, and the pump 85 thereupon being driven under such condition, the ink channels 57*b*, 57*c*, 57*m*, 57*y* are provided with a suction pressure from the head 42 side (specifically, from the exhaust portion 54). As a result, ink and gas in the ink channels 57*b*, 57*c*, 57*m*, 57*y* is discharged from the discharge ports 47. Mainly gas is discharged from the discharge ports 47. In an aspect of the present disclosure, "applying a suction pressure to channel(s) from a head side" includes applying the suction pressure to the channel(s) by using element(s) configured to apply the suction pressure to the channel(s) from a side, of the channel(s), at which the head 42 is connected to the channel(s). Such element includes, for example, the head 42, the exhaust portion 45 and the like.

[Operation of Controller 60]

The controller 60 continuously or always executes the ink automatic supply processing depicted in FIG. 6. The controller 60 executes the initial introduction processing depicted in FIG. 8 during initial setting of the printer 10. The controller 60 executes the image recording processing depicted in FIG. 7 after initial setting of the printer 10 has been completed. The controller 60 executes image recording processing and ink automatic supply processing in parallel (or time divisionally). The controller 60 stops ink automatic supply processing while initial introduction processing is being executed.

[Ink Automatic Supply Processing]

The controller 60 repeatedly executes steps S11-S26 in the ink automatic supply processing depicted in FIG. 6. The controller 60 determines whether the sensor signal Sb2 (the signal indicating that ink amount of the sub-tank 53*b* is less than the threshold value TH2) has been received from the sensor 55*b* (step S11). In response to having determined the sensor signal Sb2 to have been received (step S11: Yes), the controller 60 opens the valve 52*b* (step S12). Next, the controller 60 determines whether the sensor signal Sb1 (the signal indicating that ink amount of the sub-tank 53*b* is the threshold value TH1 or more) has been received from the sensor 54*b* (step S13). In response to having determined the sensor signal Sb1 to have been received (step S13: Yes), the controller 60 closes the valve 52*b* (step S14).

Next, the controller 60 determines whether the sensor signal Sc2 (the signal indicating that ink amount of the sub-tank 53*c* is less than the threshold value TH2) has been received from the sensor 55*c* (step S15). In response to having determined the sensor signal Sc2 to have been received (step S15: Yes), the controller 60 opens the valve 52*c* (step S16). Next, the controller 60 determines whether the sensor signal Sc1 (the signal indicating that ink amount of the sub-tank 53*c* is the threshold value TH1 or more) has been received from the sensor 54*c* (step S17). In response to having determined the sensor signal Sc1 to have been received (step S17: Yes), the controller 60 closes the valve 52*c* (step S18).

Next, the controller 60 determines whether the sensor signal Sm2 (the signal indicating that ink amount of the sub-tank 53*m* is less than the threshold value TH2) has been received from the sensor 55*m* (step S19). In response to having determined the sensor signal Sm2 to have been received (step S19: Yes), the controller 60 opens the valve 52*m* (step S20). Next, the controller 60 determines whether the sensor signal Sm1 (the signal indicating that ink amount of the sub-tank 53*m* is the threshold value TH1 or more) has been received from the sensor 54*m* (step S21). In response to having determined the sensor signal Sm1 to have been received (step S21: Yes), the controller 60 closes the valve 52*m* (step S22).

Next, the controller 60 determines whether the sensor signal Sy2 (the signal indicating that ink amount of the sub-tank 53*y* is less than the threshold value TH2) has been received from the sensor 55*y* (step S23). In response to having determined the sensor signal Sy2 to have been received (step S23: Yes), the controller 60 opens the valve 52*y* (step S24). Next, the controller 60 determines whether the sensor signal Sy1 (the signal indicating that ink amount of the sub-tank 53*y* is the threshold value TH1 or more) has been received from the sensor 54*y* (step S25). In response to having determined the sensor signal Sy1 to have been received (step S25: Yes), the controller 60 closes the valve 52*y* (step S26).

[Image Recording Processing]

The controller 60 repeatedly executes steps S31-S41 in the image recording processing depicted in FIG. 7. At a timepoint of the controller 60 executing the step S31, the carriage 41 is located in the standby position, and the cap 81 is located in the covering position. The nozzle surface 43 of the head 42 is covered by the nozzle cap 82.

The controller 60 receives an image recording instruction from an operating unit (not depicted) (step S31). Specifically, the controller 60 waits in the step S31 until it receives the image recording instruction. Upon receiving the image recording instruction in the step S31, the controller 60 closes the four valves 52*b*, 52*c*, 52*m*, 52*y* (step S32). Next, the controller 60 moves the cap 81 in a downward orientation from the covering position to the separated position (step S33).

Next, the controller 60 moves the carriage 41 in a leftward orientation to a recording start position (step S34). The recording start position is a predetermined position that the carriage 41 faces the platen 25. Next, the controller 60 conveys the sheet S to the recording start position (step S35). Note that the controller 60 may execute a step S35 in parallel with the steps S32-S34. At a timepoint of the controller 60 having completed processing up to the step S35, the printer 10 is in a state where image recording can be started.

Next, the controller 60 executes a predetermined amount of image recording on the sheet S (step S36). Specifically, the controller 60 moves the carriage 41 in the left-right direction 9. While the carriage 41 is moving in the left-right direction 9, the controller 60 causes ink corresponding to image data to be discharged from the nozzles 44 of the head 42. The step S36 is one example of a recording operation.

Next, the controller 60 determines whether there is image data remaining (step S37). In response to having determined there to be image data remaining in the step S37 (step S37: Yes), the controller 60 proceeds to a step S38. In this case, the controller 60 conveys the sheet S the predetermined amount (step S38), and proceeds to the step S36.

In response to having determined there to be no image data remaining in the step S37 (step S37: No), the controller 60 proceeds to a step S39. In this case, the controller 60 discharges the sheet S to a predetermined position (step S39). Next, the controller 60 moves the carriage 41 in a rightward orientation to the standby position (step S40). Next, the controller 60 moves the cap 81 in an upward orientation from the separated position to the covering position (step S41). After that, the controller 60 proceeds to the step S31 in order to execute the next image recording.

[Initial Introduction Processing]

At a timepoint of the printer 10 having been shipped from a factory, ink does not exist in the ink channels 56*b*, 56*c*, 56*m*, 56*y*, 57*b*, 57*c*, 57*m*, 57*y*. Accordingly, after the printer 10 has been set in place and the cartridge holder 26 installed with the cartridges 51*b*, 51*c*, 51*m*, 51*y*, the controller 60 executes the initial introduction processing depicted in FIG. 8. The initial introduction processing is a processing by which the four colors of inks are introduced into the head 42 from the cartridges 51*b*, 51*c*, 51*m*, 51*y*. At a timepoint of the controller 60 executing a step S51, the carriage 41 is located in the standby position, and the cap 81 is located in the covering position. The valves 52*b*, 52*c*, 52*m*, 52*y* are closed, and the sub-tanks 53*b*, 53*c*, 53*m*, 53*y* are empty.

After the cartridge holder 26 has been installed with the cartridges 51*b*, 51*c*, 51*m*, 51*y*, the controller 60 receives an initial introduction instruction from the operating unit (step S51). Specifically, the controller 60 waits in the step S51 until it receives the initial introduction instruction. Next, the controller 60 stops the ink automatic supply processing (step S52). While executing from a step S53 to a step S60, the controller 60 does not execute the ink automatic supply processing depicted in FIG. 6. Next, the controller 60 initializes to 1 a count value N for counting number-of-times-of-suction (step S53).

Next, the controller 60 opens the four valves 52*b*, 52*c*, 52*m*, 52*y* (step S54). Thereafter, black ink is supplied from the cartridge 51*b* to the sub-tank 53*b*, cyan ink is supplied from the cartridge 51*c* to the sub-tank 53*c*, magenta ink is supplied from the cartridge 51*m* to the sub-tank 53*m*, and yellow ink is supplied from the cartridge 51*y* to the sub-tank 53*y*. Supply of these inks is performed using water head difference.

Next, the controller 60 waits until ink amounts of the four sub-tanks 53*b*, 53*c*, 53*m*, 53*y* all become the threshold values TH1 or more (step S55). Specifically, the controller 60 waits in the step S55 until the controller 60 respectively receives the sensor signals Sb1, Sc1, Sm1, Sy1 from the sensors 54*b*, 54*c*, 54*m*, 54*y*.

Next, the controller 60 closes the four valves 52*b*, 52*c*, 52*m*, 52*y* (step S56). Thereafter, supply of black ink from the cartridge 51*b* to the sub-tank 53*b*, supply of cyan ink from the cartridge 51*c* to the sub-tank 53*c*, supply of magenta ink from the cartridge 51*m* to the sub-tank 53*m*, and supply of yellow ink from the cartridge 51*y* to the sub-tank 53*y* stop.

Next, the controller 60 performs suction by driving the pump 85 for a predetermined time (step S57). While the controller 60 is executing the step S57, the valves 52*b*, 52*c*, 52*m*, 52*y* are in a closed state. The elevator member 106 (see FIGS. 5A and 5B) is located in the abutting position, and the switching portion 84 (see FIG. 4) connects the pump 85 to the inner space of the exhaust cap 83. Therefore, the ink channels 57*b*, 57*c*, 57*m*, 57*y* are provided with a suction pressure from the head 42 side (specifically, from the exhaust portion 45; that is from a side, of the ink channels 57*b*, 57*c*, 57*m*, 57*y*, at which the head 42 is connected to the ink channels 57*b*, 57*c*, 57*m*, 57*y*), and the inks that have been stored in the sub-tanks 53*b*, 53*c*, 53*m*, 53*y* are respectively introduced into the ink channels 57*b*, 57*c*, 57*m*, 57*y*. Note that the switching portion 84 (see FIG. 4) may connect the pump 85 to the inner space of the nozzle cap 82 so that the inks in the sub-tanks 53*b*, 53*c*, 53*m*, 53*y* are respectively introduced into the ink channels 57*b*, 57*c*, 57*m*, 57*y* by a suction pressure provided via the head 42. Further, the switching portion 84 may firstly connect the pump 85 to the inner space of the exhaust cap 83 for performing suction of the inks via the exhaust portion 45. And then, after performing the suction via the exhaust portion 45 several times, the elevator portion 106 is lowered to the non-abutting position and the switching portion 84 may connect the pump 85 to the inner space of the nozzle cap 82 for performing additional or finishing suction of the inks via the nozzle 44 of the head 42.

The pump 85 sucks a predetermined amount (that is, for example, a design value planned suction amount, each of which may be decided depending on a driving duration of the pump 85, a viscosity of the ink, and the like) of ink by being driven for a predetermined time period. The predetermined amount is larger than volumes (capacities) of the sub-tanks 53*b*, 53*c*, 53*m*, 53*y* (each of which may be, for example, the difference between a volume in the expanded state and a volume in the contracted state), but smaller than volumes of the ink channels 57*b*, 57*c*, 57*m*, 57*y*. Specifically, the longer a moving distance in the left-right direction 9 of the carriage 41 is (in other words, the longer the width of the sheet S is), the longer lengths of the ink channels 57*b*, 57*c*, 57*m*, 57*y* will become. Thus, the predetermined amount sucked by the pump 85 will become smaller compared to volumes of the ink channels 57*b*, 57*c*, 57*m*, 57*y* more sufficiently. Therefore, the inks of each color that have been introduced into the ink channels 57*b*, 57*c*, 57*m*, 57*y* will not reach the head 42 simply by the step S57 having been executed once by the controller 60. Accordingly, the controller 60 repeatedly executes the steps S54-S57 a predetermined number-of-times-of-suctions (hereafter, referred to as M), as described below.

Next, the controller 60 determines whether the count value N is the predetermined number-of-times-of-suctions M or more (step S58). In response to having determined the count value N is less than the number-of-times-of-suctions M in the step S58 (S58: No), the controller 60 proceeds to a step S59. In this case, the controller 60 adds 1 to the count value N (step S59), and proceeds to the step S54 in order to execute the steps S54-S57 again.

In response to having determined the count value N is the number-of-times-of-suctions M or more in the step S58 step (S58: Yes), the controller 60 proceeds to a step S60. In this case, the controller 60 opens the four valves 52*b*, 52*c*, 52*m*, 52*y* (step S60). Next, the controller 60 resumes ink automatic supply that has been stopped in the step S52 (step S61), and finishes the initial introduction processing.

The number-of-times-of-suctions M in the step S58 is determined such that the following expressions (1) and (2) are satisfied, for example.

$$M>Q/v \tag{1}$$

$$\beta\times(m-1)\times V<v<\alpha\times m\times V \tag{2}$$

This is provided that, in expressions (1) and (2), Q is suction amount required during initial introduction, v is suction amount (total of suction amounts in all of the ink channels) when the pump 85 is driven once in the step S57, m is the number of ink channels in the ink supply unit 50, V is volume of any one of the sub-tanks 53*b*, 53*c*, 53*m*, 53*y*, and α and β indicate safety factors. The safety factors α and β take values greater than 0, but less than 1.

When the steps S54-S56 are initially executed by the controller 60, inks of amounts corresponding to the threshold values TH1 respectively flow from the cartridges 51*b*, 51*c*, 51*m*, 51*y* into the sub-tanks 53*b*, 53*c*, 53*m*, 53*y*. Subsequently, when the step S57 is executed for the first time by the controller 60, amounts of inks introduced into the ink channels 57*b*, 57*c*, 57*m*, 57*y* from the sub-tanks 53*b*, 53*c*, 53*m*, 53*y* will differ depending on channel resistances of the ink channels 57*b*, 57*c*, 57*m*, 57*y*, and so on. When the steps S54-S56 are executed a second time and thereafter by the controller 60, inks of amounts corresponding to the amounts of inks that were introduced into the ink channels 57*b*, 57*c*, 57*m*, 57*y* from the sub-tanks 53*b*, 53*c*, 53*m*, 53*y* when the step S57 was executed the previous time by the controller 60 will respectively flow from the cartridges 51*b*, 51*c*, 51*m*, 51*y* into the sub-tanks 53*b*, 53*c*, 53*m*, 53*y*.

In the initial introduction processing, after having supplied each of the sub-tanks 53*b*, 53*c*, 53*m*, 53*y* with inks of not less than amounts corresponding to the threshold values TH1, the controller 60 drives the pump 85 in a state where supply of inks to each of the sub-tanks 53*b*, 53*c*, 53*m*, 53*y* from each of the cartridges 51 has been stopped. Hence, if there is a resistance difference between the ink channels 57*b*, 57*c*, 57*m*, 57*y* and there is a difference in suction amounts between the ink channels 57*b*, 57*c*, 57*m*, 57*y*, then, after one or more of the sub-tanks 53*b*, 53*c*, 53*m*, 53*y* connected to one or more of the ink channels 57*b*, 57*c*, 57*m*, 57*y* having a small channel resistance has become empty, the suction pressure of the pump 85 will be provided to the other of the ink channels 57*b*, 57*c*, 57*m*, 57*y*. Therefore, a difference in ink amounts flowing into the head 42 through the plurality of ink channels 57*b*, 57*c*, 57*m*, 57*y* by suction becomes smaller.

Let it be assumed that in the above-described embodiment, two colors differing from each other are selected from among black, cyan, magenta, and yellow, and the first letters of the English spellings of the selected two colors are set to p and q (p and q are any of b, c, m, and y). The cartridge 51*p* is one example of a first reservoir, and the cartridge 51*q* is one example of a second reservoir. The valve 52*p* is one example of a first valve, and the valve 52*q* is one example of a second valve. The sub-tank 53*p* is one example of a first tank, and the sub-tank 53*q* is one example of a second tank. The sensor 54*p* is one example of a first sensor and a first signal outputting sensor, and the sensor 54*q* is one example of a second sensor and a second signal outputting sensor. The sensor 55*p* is one example of the first senor and a third signal outputting sensor, and the sensor 55*q* is one example of the second sensor and a fourth signal outputting sensor. The sensors 54*p* and 55*p* may be single (or integrated) sensor, and the sensors 54*q* and 55*q* may be single (or integrated) sensor. The threshold value TH1 relating to the sensor 54*p* is one example of a first threshold value, and the threshold value TH1 relating to the sensor 54*q* is one example of a second threshold value. The threshold value TH2 relating to the sensor 55*p* is one example of a third threshold value, and the threshold value TH2 relating to the sensor 55*q* is one example of a fourth threshold value. The ink channel 56*p* is one example of a channel connecting the first reservoir and the first tank, and the ink channel 56*q* is one example of a channel connecting the second reservoir and the second tank. The ink channel 57*p* is one example of a first channel, and the ink channel 57*q* is one example of a second channel.

In FIG. 6, the controller 60 opens the valve 52*p* in response to receiving the sensor signal Sp2 from the sensor 55*p*, and closes the valve 52*p* in response to receiving the sensor signal Sp1 from the sensor 54*p* subsequently to having received the sensor signal Sp2. This operation is one example of a first valve opening and closing operation. The controller 60 opens the valve 52*q* in response to receiving the sensor signal Sq2 from the sensor 55*q*, and closes the valve 52*q* in response to receiving the sensor signal Sq1 from the sensor 54*q* subsequently to having received the sensor signal Sq2. This operation is one example of a second valve opening and closing operation.

In FIG. 8, the initial introduction instruction is one example of a suction instruction, the step S54 is one example of a valve-opening operation, the step S56 is one example of a valve-closing operation, and the step S57 is one example of a suction operation. In response to having received the initial introduction instruction in the step S51, the controller 60 executes the valve-opening operation to open the valves 52*b*, 52*c*, 52*m*, 52*y* in the step S54. Subsequently to having executed the valve-opening operation and in response to having received from the sensors 54*b*, 54*c*, 54*m*, 54*y* a sensor signal indicating ink amount of the sub-tanks 53*b*, 53*c*, 53*m*, 53*y* to be the threshold value TH1 or more, the controller 60 executes the valve-closing operation to close the valves 52*b*, 52*c*, 52*m*, 52*y*. Subsequently to having executed the valve-closing operation, the controller 60 executes the suction operation to drive the pump 85 for the predetermined time period.

Effects of Embodiments

In the printer 10 and ink supply unit 50 according to the above-described embodiment, in the case that suction is performed to introduce ink into the plurality of ink channels 56*b*, 56*c*, 56*m*, 56*y* and plurality of ink channels 57*b*, 57*c*, 57*m*, 57*y* connecting the plurality of cartridges 51 and the head 42, the pump 85 is driven in a state where the ink of not less than a predetermined amount has been supplied to each of the sub-tanks 53*b*, 53*c*, 53*m*, 53*y* and supply of ink to each of the sub-tanks 53*b*, 53*c*, 53*m*, 53*y* from each of the cartridges 51 then has been stopped. Therefore, difference in ink amounts flowing into the head 42 through the plurality of ink channels 57*b*, 57*c*, 57*m*, 57*y* by suction becomes smaller.

The controller 60 executes the valve-opening operation after executing the suction operation. Hence, after the suction operation has been executed, ink will be supplied to each of the sub-tanks 53*b*, 53*c*, 53*m*, 53*y*. The controller 60 opens the corresponding one of the valves 52*b*, 52*c*, 52*m*, 52*y* in response to receiving from one of the sensors 55*b*,

55*c*, 55*m*, 55*y* a sensor signal indicating ink amount of one of the sub-tanks 53*b*, 55*c*, 55*m*, 55*y* is less than the threshold value TH2. Hence, when ink amount of each of the sub-tanks 53*b*, 53*c*, 53*m*, 53*y* becomes less than a designated amount, ink will be supplied to each of the sub-tanks 53*b*, 53*c*, 53*m*, 53*y*.

In response to receiving the initial introduction instruction, the controller 60 repeatedly executes the valve-opening operation, the valve-closing operation, and the suction operation the predetermined number-of-times-of-suctions M (one example of a predetermined number of times). Hence, a required amount of ink can be introduced into each of the ink channels 57. After having repeatedly executed the valve-opening operation, the valve-closing operation, and the suction operation the number-of-times-of-suctions M, the controller 60 executes the valve-opening operation. Hence, after the valve-opening operation, the valve-closing operation, and the suction operation have been repeatedly executed, ink will be supplied to each of the sub-tanks 53.

The controller 60 executes the image recording operation in a state of the valves 52*b*, 52*c*, 52*m*, 52*y* having been closed. The controller 60 executes the first valve opening and closing operation and the second valve opening and closing operation, and, in response to receiving the initial introduction instruction, does not execute (that is, stops) the first valve opening and closing operation and the second valve opening and closing operation until execution of the suction operation has been completed. Hence, even in the case of automatic supply of inks from each of the cartridges 51 to each of the sub-tanks 53*b*, 53*c*, 53*m*, 53*y* being performed, automatic supply of the inks will be stopped and each of the valves 52*b*, 52*c*, 52*m*, 52*y* will be closed until execution of the suction operation is completed.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modified Example

Various kinds of modified examples may be configured for the printer 10 and controller 60 according to the above-described embodiment. In the above-described embodiment, controller 60 executes the initial introduction processing depicted in FIG. 8. In a modified example, a controller 60 executes an initial introduction processing depicted in FIG. 9.

The initial introduction processing depicted in FIG. 9 is the initial introduction processing depicted in FIG. 8 to which a step S71 and a step S74 have been added and in which the step S54 and the step S56 have been respectively replaced by a step S72 and a step S73. The controller 60 according to the modified example uses four flags Fb, Fc, Fm, Fy respectively corresponding to black, cyan, magenta, and yellow to execute the initial introduction processing. Each of the flags Fb, Fc, Fm, Fy is cleared in a state where introduced amount of the ink of corresponding color is insufficient, and is set in a state where introduced amounts of the ink of corresponding color is sufficient. The flags Fb, Fc, Fm, Fy are stored in the RAM 63 (see FIG. 3).

After executing the step S51 and the step S52, the controller 60 clears the four flags Fb, Fc, Fm, Fy (step S71). After executing the step S53 or the step S59, the controller 60 opens valves corresponding to cleared flags, of the valves 52*b*, 52*c*, 52*m*, 52*y* (step S72). If, for example, the flags Fb, Fy are cleared and the flags Fc, Fm are set, then in the step S72, the controller 60 will open the valves 52*b*, 52*y* and leave closed the valves 52*c*, 52*m*.

After executing the step S55, the controller 60 closes valves that are open, of the valves 52*b*, 52*c*, 52*m*, 52*y* (step S73). After executing the step S57, the controller 60 sets flags of colors whose ink introduction amounts are sufficient, of the flags Fb, Fc, Fm, Fy (step S74). In the step S74, the controller 60 determines whether ink introduction amounts of each of the colors are sufficient, based on the sensor signals Sb1, Sc1, Sm1, Sy1, Sb2, Sc2, Sm2, Sy2 respectively outputted from the sensors 54*b*, 54*c*, 54*m*, 54*y*, 55*b*, 55*c*, 55*m*, 55*y*. For example, the controller 60 will set the flag Fb in response to a determination that introduction amount of black ink has become sufficient by the step S57 executed immediately priorly.

In the controller 60 according to the modified example, after executing the valve-opening operation, the valve-closing operation, and the suction operation a certain number of times which is fewer than the predetermined number-of-times-of-suctions M, the controller 60 keeps at least one of the valves 52*b*, 52*c*, 52*m*, 52*y* in a closed state in the valve-opening operation. Hence, this modified example results in that, for a channel where introduction of ink has been completed, supply of ink from the cartridge 51 to the corresponding one of the sub-tanks 53*b*, 53*c*, 53*m*, 53*y* can be stopped and needless discharge of ink thereby prevented.

In the above-described embodiment, the printer 10 is configured to comprise one head 42. However, the printer 10 may comprise two or more heads 42. In the above-described embodiment, the ink supply unit 50 of the printer 10 is configured to comprise four ink channels. However, the printer 10 may comprise two, three, or five or more ink channels.

What is claimed is:

1. A liquid supply device comprising:

a first reservoir configured to store a first liquid;

a second reservoir configured to store a second liquid;

a first tank having flexibility, the first tank being positioned lower than the first reservoir;

a second tank having a flexibility, the second tank being positioned lower than the second reservoir;

a first valve configured to open and close a channel connecting the first reservoir and the first tank;

a second valve configured to open and close a channel connecting the second reservoir and the second tank;

a head, the first liquid being capable of flowing into the head from the first tank through a first channel, the second liquid being capable of flowing into the head from the second tank through a second channel;

a suction mechanism configured to drive so that a suction pressure is applied to the first channel and the second channel from a head side, of the first channel and the second channel, at which the head is positioned;

a first sensor;

a second sensor; and a controller, wherein the controller is configured to:

execute a valve-opening operation of opening the first valve and the second valve, in response to a suction instruction;

execute, after executing the valve-opening operation, a valve-closing operation of closing the first valve depending on output of a first signal from the first sensor, and closing the second valve depending on output of a second signal from the second sensor, the first signal being a signal indicating that an amount of the first liquid in the first tank is a first threshold value or more, the second signal being a signal indicating that an amount of the second liquid in the second tank is a second threshold value or more;

execute, after executing the valve-closing operation, a suction operation of driving the suction mechanism, for a predetermined time period, so as to suck the first liquid in the first tank to the head through the first channel and suck the second liquid in the second tank to the head through the second channel, the sucking of the first liquid in the first tank and the sucking of the second liquid in the second tank being started after the closing of the first valve and the second valve;

execute a first valve opening and closing operation of opening the first valve depending on output of a third signal from the first sensor, and closing the first valve depending on output of the first signal from the first sensor after the outputting of the third signal, the third signal being a signal indicating that the amount of the first liquid in the first tank is less than the first threshold value or a signal indicating that the amount of the first liquid in the first tank is less than a third threshold value smaller than the first threshold value; and stop the first valve opening and closing operation in response to the receiving of the suction instruction until completion of the executing of the suction operation.

2. The liquid supply device according to claim 1, wherein the controller is configured to execute, after executing the suction operation, the valve-opening operation again.

3. The liquid supply device according to claim 1, wherein the controller is configured to open the first valve depending on output of the third signal from the first sensor, and open the second valve depending on output of a fourth signal from the second sensor, the fourth signal being a signal indicating that the amount of the second liquid in the second tank is less than a fourth threshold value smaller than the second threshold value.

4. The liquid supply device according to claim 3, wherein the first sensor includes a first signal outputting sensor configured to output the first signal and a third signal outputting sensor configured to output the third signal, and the second sensor includes a second signal outputting sensor configured to output the second signal and a fourth signal outputting sensor configured to output the fourth signal.

5. The liquid supply device according to claim 2, wherein the controller is configured to repeatedly execute the valve-opening operation, the valve-closing operation, and the suction operation a predetermined number of times, in response to the suction instruction.

6. The liquid supply device according to claim 5, wherein the controller is configured to keep the first valve in a closed state in the valve-opening operation, after executing the valve-opening operation, the valve-closing operation, and the suction operation a certain number of times fewer than the predetermined number of times.

7. The liquid supply device according to claim 5, wherein the controller is configured to execute the valve-opening operation again, after having repeatedly executed the valve-opening operation, the valve-closing operation, and the suction operation the predetermined number of times.

8. The liquid supply device according to claim 1, wherein the suction device sucks each of the first liquid and the second liquid as much as a predetermined amount by being driven for the predetermined time period, and the predetermined amount is larger than a volume of the first tank and a volume of the second tank.

9. The liquid supply device according to claim 1, wherein the controller is configured to:

execute a recording operation of discharging the first liquid and the second liquid from the head, in a state that the first valve and the second valve are closed;

execute a second valve opening and closing operation of opening the second valve depending on output of a fourth signal from the second sensor, and closing the second valve depending on output of the second signal from the second sensor after the outputting of the fourth signal, the fourth signal being a signal indicating that the amount of the second liquid in the second tank is less than a fourth threshold value smaller than the second threshold value; and stop the second valve opening and closing operation in response to the receiving of the suction instruction until completion of the executing of the suction operation.

10. The liquid supply device according to claim 9, wherein the first sensor includes a first signal outputting sensor configured to output the first signal and a third signal outputting sensor configured to output the third signal, and the second sensor includes a second signal outputting sensor configured to output the second signal and a fourth signal outputting sensor configured to output the fourth signal.

11. An image recording device comprising:

the liquid supply device as defined in claim 1; and a conveyer configured to convey a recording medium to which the first liquid and the second liquid are to be discharged from the head.

12. The liquid supply device according to claim 1, wherein the third signal is the signal indicating that the amount of the first liquid in the first tank is less than the third threshold value.

13. A method of supplying liquid using a first reservoir configured to store a first liquid; a second reservoir configured to store a second liquid; a first tank which has a flexibility and which is positioned lower than the first reservoir; a second tank which has a flexibility and which is positioned lower than the second reservoir; and a head, the first liquid being capable of flowing into the head from the first tank through a first channel, the second liquid being capable of flowing into the head from the second tank through a second channel, the method comprising:

opening a first valve configured to open and close a channel connecting the first reservoir and first tank, and opening a second valve configured to open and close a channel connecting the second reservoir and the second tank, in response to receiving of a suction instruction;

after the opening of the first valve and the second valve, closing the first valve depending on output of a first signal from a first sensor, and closing the second valve depending on output of a second signal from a second sensor, the first signal being a signal indicating that an amount of the first liquid in the first tank is a first threshold value or more, the second signal being a signal indicating that an amount of the second liquid in the second tank is a second threshold value or more;

after the closing of the first valve and the second valve, driving a suction mechanism for a predetermined time period, the suction mechanism being configured to drive so that a suction pressure is applied to the first channel and the second channel from a head side, of the first channel and the second channel, at which the head is positioned;

executing a first valve opening and closing operation of opening the first valve depending on output of a third signal from the first sensor, and closing the first valve depending on output of the first signal from the first sensor after the outputting of the third signal, the third signal being a signal indicating that the amount of the first liquid in the first tank is less than the first threshold value or a signal indicating that the amount of the first liquid in the first tank is less than a third threshold value smaller than the first threshold value; and stopping the first valve opening and closing operation in response to the receiving of the suction instruction until completion of the executing of the suction operation.

* * * * *